United States Patent [19]
Bukoschek et al.

[11] Patent Number: 6,093,987
[45] Date of Patent: Jul. 25, 2000

[54] APPLIANCE HAVING AN A.C. SERIES MOTOR AND HAVING SWITCHING MEANS FOR SWITCHING THIS MOTOR TO DIFFERENT SPEEDS

[75] Inventors: Romuald L. Bukoschek, Klagenfurt; Albrecht Griesshammer, Keutschach; Martin Sonnek, St. Veit/Glan, all of Austria

[73] Assignee: U.S. Philips Corporation, New York, N.Y.

[21] Appl. No.: 09/326,505

[22] Filed: Jun. 4, 1999

[30] Foreign Application Priority Data

Jun. 5, 1998 [EP] European Pat. Off. .............. 98890172

[51] Int. Cl.[7] ............................ H02K 11/00; H02K 7/14; H02P 7/10; H02P 7/12
[52] U.S. Cl. ............................ 310/68 A; 310/50; 318/252
[58] Field of Search ................................... 310/50, 68 A, 310/158; 318/245, 252

[56] References Cited

U.S. PATENT DOCUMENTS

| | | |
|---|---|---|
| 3,286,150 | 11/1966 | Wilson et al. ............................ 318/245 |
| 3,493,833 | 2/1970 | Swanke ..................................... 318/252 |
| 3,596,161 | 7/1971 | Swanke et al. ........................... 318/305 |
| 3,604,994 | 9/1971 | Conlon ..................................... 318/252 |
| 3,609,491 | 9/1971 | Swanke ..................................... 318/252 |
| 3,668,491 | 6/1972 | Kelly et al. ............................... 318/245 |
| 3,678,357 | 7/1972 | Swanke et al. ........................... 318/245 |
| 4,071,789 | 1/1978 | Ernster et al. ............................. 310/50 |

*Primary Examiner*—Clayton LaBalle
*Attorney, Agent, or Firm*—Ernestine C. Bartlett

[57] ABSTRACT

In an appliance having an a.c. series motor, which comprises a rotor coil configuration and two stator coils, switching means are provided for switching the a.c. series motor to different speeds or speed characteristics. Both coil ends of each of the two stator coils are accessible from outside of the a.c. series motor and are connected to the switching means. The switching means connects either one stator coil or both stator coils in series or both stator coils in parallel and in series with the rotor coil configuration.

13 Claims, 2 Drawing Sheets

APPLIANCE HAVING AN A.C. SERIES MOTOR AND HAVING SWITCHING MEANS FOR SWITCHING THIS MOTOR TO DIFFERENT SPEEDS

BACKGROUND OF THE INVENTION

This invention relates to an appliance having at least one drivable appliance part and having a motor drive arrangement for driving the at least one appliance part, which motor drive arrangement comprises an a.c. series motor and includes switching means for switching the a.c. series motor to different speeds or speed characteristics, which switching means are connected to the a.c. series motor, and wherein the a.c. series motor comprises a rotor and a rotor coil configuration and commutator means and a stator and two stator coils each having two coil ends with one stator coil having one coil end connected to the switching means.

An appliance of the type defined in the opening paragraph is commercially available in several variants and is consequently known. In the known appliance only one coil terminal of each of the two stator coils is accessible from outside the a.c. series motor and one of the two stator coils has one coil end connected to the switching means and, in addition, has three taps which each lead to the switching means, as a result of which the switching means can activate either the whole stator coil or only a part of the stator coil, thereby enabling different speeds or speed characteristics of the a.c. series motor to be selected or switched on. Such an a.c. series motor having a tapped stator coil is comparatively expensive and requires a comparatively intricate manufacturing process, because it is comparatively intricate and expensive to wind a tapped stator coil, which is unfavorable in order to minimize the manufacturing costs of an appliance having such a motor. Moreover, the taps form vulnerable points in the known appliance, which vulnerability may lead to more repairs.

SUMMARY OF THE INVENTION

It is an object of the invention to preclude the aforementioned problems and to provide an improved appliance. According to the invention, in order to achieve this object, an appliance of the type defined in the opening paragraph is characterized in that both coil ends of each of the two stator coils are accessible from outside the a.c. series motor, and both stator coils have both coil ends connected to the switching means, and the switching means have such a design that with the aid of the switching means either one stator coil or both stator coils in series or both stator coils in parallel can be arranged in series with the rotor coil configuration.

Owing to the measures taken in accordance with the invention, switching to different speeds or speed characteristics in an appliance having an a.c. series motor can be effected by very simple and cheap means, the desired result being achieved in an advantageous manner without the provision of taps on a stator coil of this motor and it merely being necessary to adapt the construction of the switching means, which are required anyway in such an appliance, to the demands of the present invention, which in practice will not make the switching means more expensive but may even make them cheaper.

In an appliance in accordance with the invention as defined herein, three different speeds or speed characteristics of the a.c. series motor can be selected in a simple manner. In such an appliance it has proved to be advantageous, in addition, to provide at least one diode, connected to the switching means and in series with at least one of the stator coils via the switching means. As a result of this, it is achieved in a simple manner that in total seven different speeds or speed characteristics of the a.c. series motor can be selected.

Other measures will be described which make an appliance in accordance with the invention advantageous in that the circuit arrangement is particularly simple and reliable.

The afore-mentioned aspects as well as further aspects of the invention will be apparent from the embodiment described hereinafter by way of example and will be elucidated with reference to this example.

BRIEF DESCRIPTION OF THE DRAWINGS

The invention will now be described in more detail with reference to the drawings, which show an embodiment, given by way of example, to which the invention is not limited.

DESCRIPTION OF THE PREFERRED EMBODIMENTS

Figure 4:
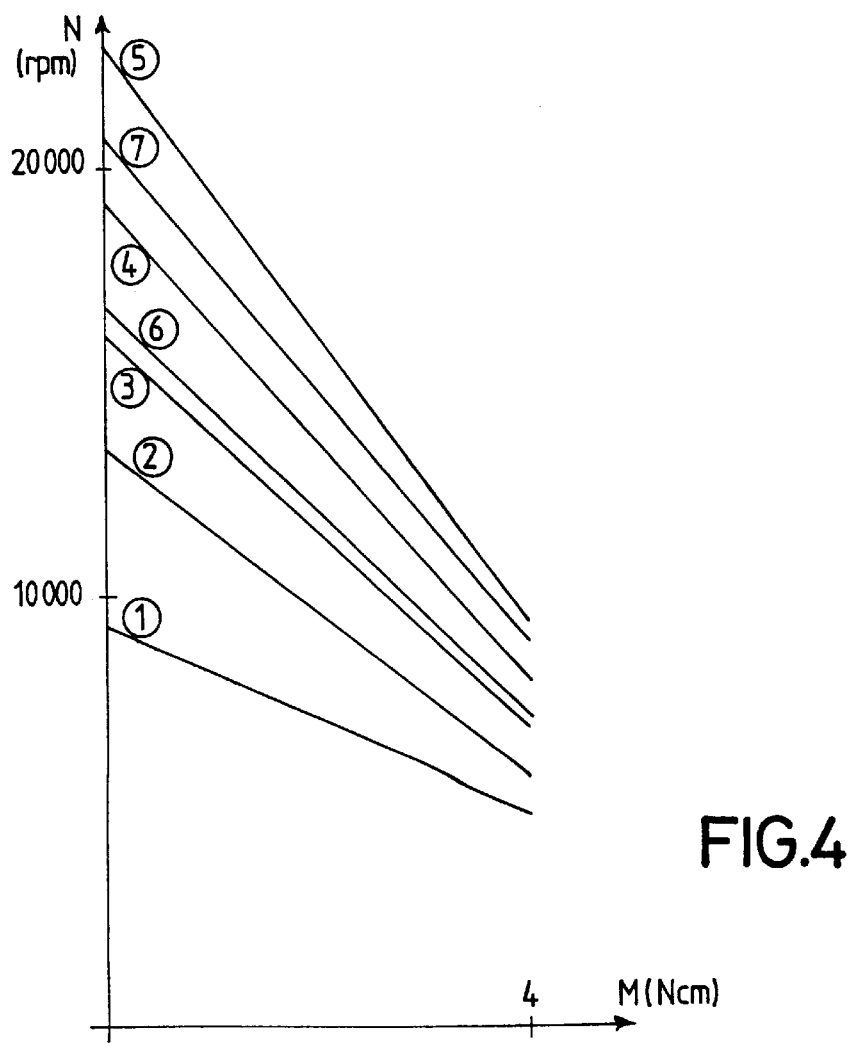

FIG. 4 is a diagram which diagrammatically represents the motor speed characteristics in dependence on the motor torque attainable by means of the circuit configurations shown in FIGS. 2A to 2G.

Figure 1:
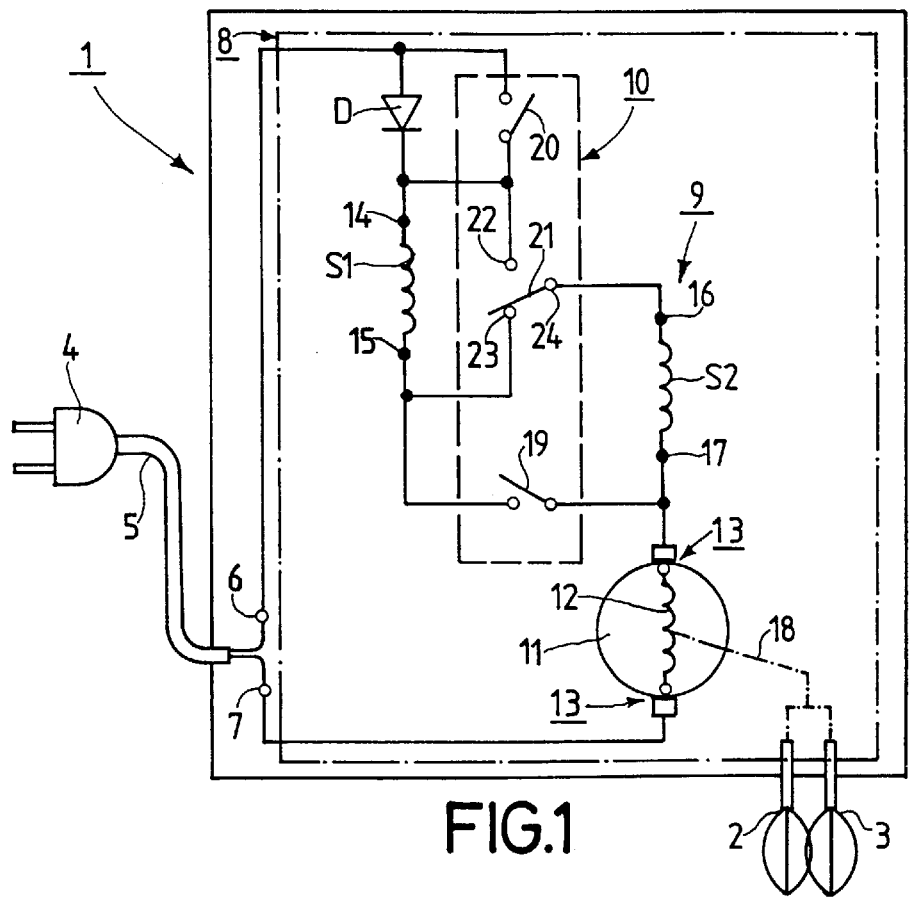
FIG. 1 shows, partly in a highly diagrammatic manner, an embodiment of an appliance in accordance with the invention.

FIG. 1 shows an appliance 1, partly in a highly diagrammatic manner. The appliance 1 is a so-called hand mixer. The appliance 1 has two drivable appliance parts, namely two beaters 2 and 3. The appliance 1 has a mains plug 4 from which a mains lead 5 leads into the interior of the appliance, two electrical conductors of the mains lead 5 being connected to two terminals 6 and 7.

To drive the two beaters 2 and 3 the appliance 1 includes a motor drive arrangement 8, which comprises an a.c. series motor 9 and switching means 10 for switching the a.c. series motor 9 to different speeds or speed characteristics, said switching means being connected to parts of the a.c. series motor 9. In the drive arrangement 8 of the appliance 1 the a.c. series motor 9 comprises a rotor 11 and a diagrammatically shown rotor coil configuration 12, which comprises a plurality of rotor coils, and commutator means 13 and a stator, not shown in FIG. 1, and two stator coils S1 and S2 each having two coil ends 14, 15 and 16, 17, respectively.

A drive transmission 18, shown diagrammatically as a dash-dot line, can be driven by means of the rotor 11. The two beaters 2 and 3 can be driven via the drive transmission 18.

In such appliances, as with the appliance 1 in the form of a hand mixer, it is desirable that different speeds, namely nominal speeds or speed characteristics for the drivable appliance parts can be selected and switched on. In order to enable the appliance 1 to be set to such different speeds in a simple and reliable manner, the measures described hereinafter have been taken in the appliance 1.

For this purpose, both coil ends 14, 15 and 16, 17 of the two stator coils S1 and S2, respectively, in the appliance 1 are accessible from outside the a.c. series motor 9 and each of the two stator coils S1 and S2 have both coil ends 14, 15 and 16, 17 connected to the switching means 10. Furthermore, the switching means 10 are implemented in such a manner that with the aid of the switching means 10 either one stator coil, in the present case the stator coil S2, or both stator coils S1 and S2 in series, or both stator coils S1 and S2 in parallel, can be arranged in series with the rotor coil configuration 12. The drive arrangement 8 of the appliance 1 in addition comprises a diode D, which is also connected to the switching means 10 and which can be arranged in series with at least one of the two stator coils S1 and S2 with the aid of the switching means 10.

In the drive arrangement 8 the two stator coils S1 and S2 can be arranged in series and in parallel and, if desired, the diode D can be arranged in series with two series-connected or parallel-connected stator coils S1 and S2 and with the rotor coil configuration 12, all with the aid of the switching means 10.

The switching means 10 include a first switch 19, a second switch 20 and a change-over switch 21. The circuit arrangement comprising the two stator coils S1 and S2, the diode D, the two switches 19 and 20 and the change-over switch 21 is such that the diode D, the first stator coil S1, the first switch 19 of the switching means 10 and, via the commutator means 13, the rotor coil configuration 12 are arranged in series in the given order, that the second switch 20 of switching means 10 is arranged in parallel with the diode D, that the change-over switch 21 of switching means 10 has its two change-over contacts 22 and 23 arranged in parallel with the first stator coil S1, and that the main contact 24 of the change-over switch 21 is connected to the first coil end 16 of the second stator coil S2, which has its second end 17 arranged in series with the rotor coil configuration 12 via the commutator means 13.

With the aid of the circuit arrangement described hereinbefore it is possible to realize different circuit configurations comprising the stator coils S1 and S2, the diode D, the commutator means 13 and the rotor coil configuration 12.

Figure 2A:
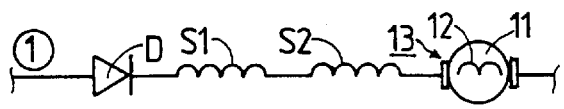
FIGS. 2A to 2F show circuit configurations which can be realized in the appliance in accordance with the invention.

The circuit configuration shown in FIG. 2A is obtained when the second switch 20 is opened and the first switch 19 is also opened, while the change-over switch 21 is set to its first switch position, in which the second change-over contact 23 is connected to the main contact 24.

Figure 2B:
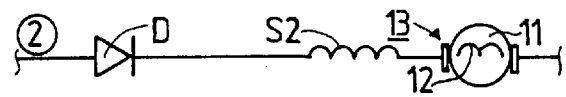

The circuit configuration shown in FIG. 2B is obtained when the second switch 20 is opened and the first switch 19 is also opened, while the change-over switch 21 is set to its second switch position, in which its first change-over contact 22 is connected to the main contact 24.

Figure 2C:
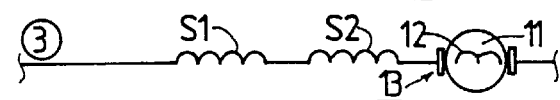

The circuit configuration shown in FIG. 2C is obtained when the second switch 20 is closed and the first switch 19 is opened, while the change-over switch 21 is set to its first switch position.

Figure 2D:
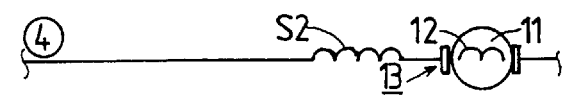

The circuit configuration shown in FIG. 2D is obtained when the second switch 20 is closed and the first switch 19 is opened, while the change-over switch 21 is set to its second switch position.

Figure 2E:

The circuit configuration shown in FIG. 2E is obtained when the second switch 20 is closed and the first switch 19 is also closed, while the change-over switch 21 is set to its second switch position.

Figure 2F:
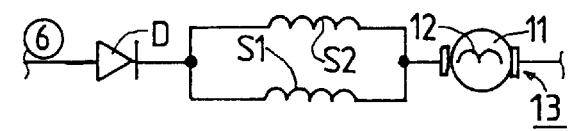

The circuit configuration shown in FIG. 2F is obtained when the second switch 20 is opened and the first switch 19 is closed, while the change-over switch 21 is set to its second switch position.

In an appliance 1 as shown in FIG. 1, as is apparent from the preceding description, it is achieved in an advantageous manner that, with the aid of the switching means 10, which are anyway available in such an appliance and which merely have to be adapted to the specifications defined for the appliance 1, a total of six different circuit configurations can be realized between the two stator coils S1 and S2 and the diode D, as a result of which a total of six different speeds or speed characteristics can be obtained. The attainable speed characteristics are shown highly diagrammatically in FIG. 4. In FIG. 4 these speed characteristics bear the numbers 1, 2, 3, 4, 5 and 6. These numbers from 1 to 6 have also been assigned to the circuit configurations shown in FIGS. 2A to 2F and corresponding to the speed characteristics shown. In reality, these speed characteristics are not linear but have a curved shape because for low torque values a comparatively strong drop in speed occurs, which diminishes towards higher torque value, as a result of which the speed characteristic is initially steeper and is subsequently less steep.

Figure 2G:
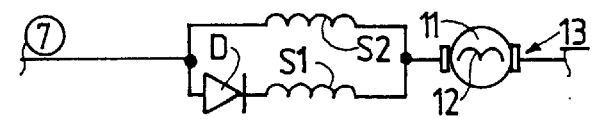
FIG. 2G shows a further circuit configuration which, in addition to the circuit configurations shown in FIGS. 2A to 2F, can be realized in a variant of the appliance of FIG. 1.
Figure 3:
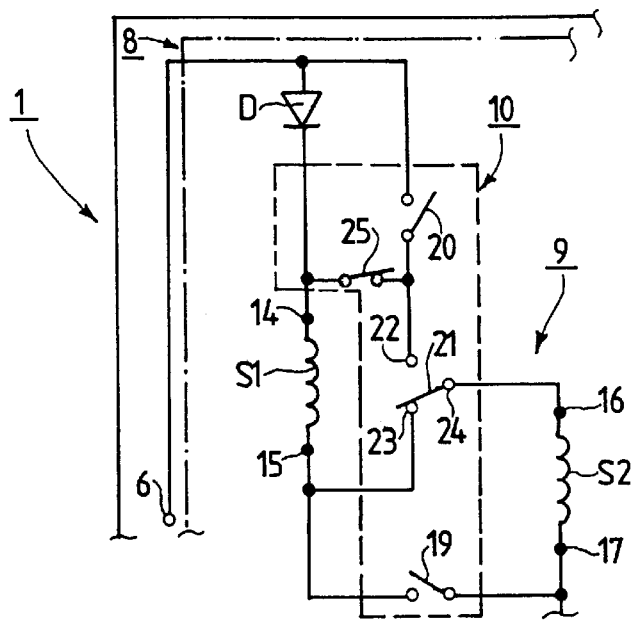
FIG. 3 shows a part of the variant of the appliance of FIG. 1, by means of which the circuit configuration shown in FIG. 2G can be realized.

FIG. 3, similarly to FIG. 1, shows only a part of the drive arrangement 8 of a variant of the appliance 1 of FIG. 1, namely the part which includes the diode D, the first stator coil S1, the second stator coil S2 and the switching means 10. In the appliance variant shown in FIG. 3 the connection between the first coil end 14 of the first stator coil S1 and the first change-over contact 22 of the first change-over switch 21 of the switching means 10 in addition includes a third switch 25. Owing to this circuit arrangement the appliance variant of FIG. 3 can also realize the circuit configuration of FIG. 2G in addition to the circuit configurations of FIGS. 2A to 2F. The circuit configuration shown in FIG. 2G is obtained when the second switch 20 is closed, while the first change-over switch 21 is set to its second switch position, the third switch 25 is set to its non-conductive switch position, and the first switch 19 is closed.

In the appliance variant shown in FIG. 3 the additional provision of the third switch 25 enables a total of seven circuit configurations to be realized between the two stator coils S1 and S2 and the diode D, as a result of which a total of seven speeds or speed characteristics can be obtained.

In FIG. 4 the seventh speed characteristic bears the number 7. The number 7 has also been assigned to the circuit configuration of FIG. 2G to indicate that it corresponds to said speed characteristic.

It is to be noted that the switching means 10 described hereinbefore may be realized with the aid of mechanically actuated switches but that said switching means 10 can also be realized by electronic switches such as transistors, triacs but also diodes and the like. Furthermore, it is to be noted that the drive arrangements described hereinbefore may also include interference suppression means such as capacitors and HF coils, which are not shown for the sake of simplicity.

The invention is not limited to the embodiment described hereinbefore by way of example, because other circuit arrangements having the two stator coils and a diode and differently implemented switching means are also possible. Moreover, it is possible to realize a circuit arrangement which does not include a diode but which utilizes only the two stator coils.

What is claimed is:

1. An appliance having at least one drivable appliance part and having a motor drive arrangement for driving the at least one appliance part, which motor drive arrangement comprises an a.c. series motor and includes switching means for switching the a.c. series motor to different speeds or speed characteristics, means connecting the switching means to the a.c. series motor, and wherein the a.c. series motor comprises a rotor and a rotor coil configuration, commutator means and a stator and two stator coils each having two coil ends, one stator coil having one coil end connected to the switching means, wherein both coil ends of each of the two stator coils are accessible from outside of the a.c. series motor, and both stator coils have both coil ends connected to the switching means, and the switching means include a change-over switch coupled to the two stator coils whereby the switching means connects either one stator coil or both stator coils in series or both stator coils in parallel and in series with the rotor coil configuration.

2. An appliance as claimed in claim 1, further comprising: at least one diode connected to the switching means for connection in series with at least one of the two stator coils by means of the switching means.

3. An appliance as claimed in claim 2, wherein the switching means connects the two stator coils in parallel and the diode in series with the parallel arrangement of the two stator coils.

4. An appliance as claimed in claim 1, wherein the two stator coils are identical as regards their number of turns and the wire diameter of the coil wire.

5. An appliance as claimed in claim 1 wherein the switching means comprise first, second and third switches selectively operable independently of one another.

6. An appliance having at least one drivable appliance part and having a motor drive arrangement for driving the at least one appliance part, which motor drive arrangement comprises an ac series motor and includes switching means for switching the ac series motor to different speeds or speed characteristics, means connecting the switching means to the ac series motor, and wherein the ac series motor comprises a rotor and a rotor coil configuration, commutator means and a stator and two stator coils each having two coil ends, one stator coil having one coil end connected to the switching means, wherein both coil ends of each of the two stator coils are accessible from outside of the ac series motor, and both stator coils have both coil ends connected to the switching means, wherein the switching means connect one stator coil or both stator coils in series or both stator coils in parallel and in series with the rotor coil configuration, a diode connected to the switching means for connection in series with at least one of the two stator coils by means of the switching means, and wherein the switching means connects one stator coil and the diode in series circuit and the other stator coil in parallel with said series circuit of the one stator coil and the diode.

7. An appliance having at least one drivable appliance part and having a motor drive arrangement for driving the at least one appliance part, which motor drive arrangement comprises an ac series motor and includes switching means for switching the ac series motor to different speeds or speed characteristics, means connecting the switching means to the a.c. series motor, and wherein the a.c. series motor comprises a rotor and a rotor coil configuration, commutator means and a stator and two stator coils each having two coil ends, one stator coil having one coil end connected to the switching means, wherein both coil ends of each of the two stator coils are accessible from outside of the a.c. series motor, and both stator coils have both coil ends connected to the switching means, wherein the switching means connect one stator coil or both stator coils in series or both stator coils in parallel and in series with the rotor coil configuration, a diode connected to the switching means for connection in series with at least one of the two stator coils by means of the switching means, wherein the diode and a first stator coil and a first switch of the switching means and, via the commutator means, the rotor coil configuration are arranged in series in that order, and a second switch of the switching means is arranged in parallel with the diode, and a change-over switch of the switching means has two change-over contacts arranged in parallel with the first stator coil and a main contact thereof connected to a first coil end of the second stator coil, and a second end of the second stator coil is connected in series with the rotor coil configuration via the commutator means.

8. A speed control circuit for an a.c. series motor having a rotor coil, commutator means and first and second stator coils each having two coil ends accessible from outside of the a.c. series motor, comprising:

input terminals for connection to a source of motor supply voltage, switching means including only three switches, a diode, first means connecting a first switch of the switching means and the diode in parallel to a first one of the input terminals, second means connecting the first stator coil to contacts of the first, second and third switches of the switching means, third means connecting the second stator coil to respective contacts of the second and third switches of the switching means, and fourth means connecting one coil end of the second stator coil and one contact of the third switching means to a second one of the input terminals via said commutator means and said rotor coil, and wherein the switching means are operable to selectively connect one stator coil or both stator coils in series or both stator coils in parallel and in series with the rotor coil, the diode in series with the first stator coil or in series with the first and second stator coils, and the diode in series with a parallel connection of the first and second stator coils.

9. The speed control circuit as claimed in claim 8 wherein one terminal of the rotor coil is directly connected to the second input terminal via the commutator means.

10. The speed control circuit as claimed in claim 8 wherein the second switch is a change-over switch having first and second change-over contacts connected to first and second coil ends of the first stator coil, respectively, and a main contact connected to the other coil end of the second stator coil.

11. The speed control circuit as claimed in claim 8 further comprises a junction point between the diode and the first stator coil, and the switching means include a fourth switch connecting said junction point to a contact of the second switch.

12. The speed control circuit as claimed in claim 8 wherein the first, second and third switches of the switching means are selectively operable independently of one another.

13. The speed control circuit as claimed in claim 8 wherein the switching means includes a fourth switch arranged so that the switching means selectively connects the diode in series circuit with one stator coil and connects the other stator coil in parallel with said series circuit.

* * * * *